United States Patent [19]

Tart, Jr. et al.

[11] Patent Number: 4,742,806
[45] Date of Patent: May 10, 1988

[54] AUXILIARY ENGINE BRAKING SYSTEM

[76] Inventors: Earl D. Tart, Jr., 2500 Parliament Dr., Abingdon, Md. 21009; John B. Gilbert, 115 Marshall Dr., Forest Hill, Md. 21050

[21] Appl. No.: 905,560

[22] Filed: Sep. 10, 1986

[51] Int. Cl.$^4$ .............................................. F02D 9/04
[52] U.S. Cl. ...................................... 123/322; 74/879
[58] Field of Search ............... 123/320, 321, 198 DB, 123/90.15, 322, 90.12, 90.16; 74/879; 180/321

[56] References Cited

U.S. PATENT DOCUMENTS

| | | | |
|---|---|---|---|
| 1,897,537 | 2/1933 | Sullivan et al. | 74/879 |
| 2,026,220 | 12/1935 | Denker | 74/879 |
| 3,220,392 | 11/1965 | Cummins | 123/321 |
| 3,525,317 | 3/1968 | Muir | 123/320 |
| 3,786,792 | 1/1974 | Pelizzoni et al. | 123/321 |

*Primary Examiner*—Tony M. Argenbright
*Assistant Examiner*—Eric R. Carlberg
*Attorney, Agent, or Firm*—Leonard Bloom

[57] ABSTRACT

An auxiliary braking system of the compression relief type in a vehicle having a diesel engine. The vehicle is provided with an accelerator pedal, a shift lever provided with a knob and a clutch pedal. The auxiliary braking system is armed by a switch means mounted, at least in part, on the knob of the shift lever. The arming switch means includes a microswitch mounted within the knob and a push-button activator protruding therefrom. The switch means may include a relay positioned elsewhere, contacts of which are in series with a series circuit arranged to deliver energizing current to means which enable the auxiliary braking system. The switch means may be in parallel with a principal arming switch which alternatively may be used to arm the sytem, the principal arming switch being positioned on the dashboard of the vehicle.

42 Claims, 5 Drawing Sheets

AUXILIARY ENGINE BRAKING SYSTEM

BACKGROUND OF THE INVENTION

1. Field of the Invention

The invention is concerned with a vehicle-retarding engine braking system of the compression relief type. In particular, the invention relates to a braking system of the compression relief type which is employed in engines of vehicles to aid in slowing down the vehicle in normal operation by opening an exhaust valve or valves to relieve the related cylinder or cylinder of the gases of compression near the end of a compression stroke or stroke. In effect, one, more or all of the cylinders of the engine are converted from power-producing engine components into a power-absorbing air compressor.

2. The Prior Art

A vehicle-retarding, engine braking system of the compression relief type is known from the U.S. Pat. No. 3,220,392 to Clessie L. Cummins entitled "Vehicle Engine Braking and Fuel Control System" and granted Nov. 30, 1965. When this prior art system is placed into operation, a slave piston is hydraulically operated against a return spring to open an exhaust valve or valves of a cylinder or cylinders in a timely fashion so that the exhaust valve or valves is opened near the end of its compression stroke thereby allowing the gases of compression to escape from the cylinder or cylinders near the end of the compression strokes. It was determined that if the slave piston should fail to return after opening the exhaust valve, for example because of a broken spring or the like, the slave piston may become locked or be jacked downwardly relative to the exhaust valve or valves by hydraulic fluid, preventing the exhaust valve or valves from closing.

The problem of the locked or downwardly jacked exhaust valves was recognized and the problem solved by a modified vehicle-retarding, engine braking system as disclosed in the U.S. Pat. No. 3,405,699 to Laas entitled "Engine Braking System with Trip Valve Controlled Piston" and granted Oct. 15, 1968. The modified system involved replacing the slave piston with a combined safety trip valve and work piston. In an engine braking system of the compression relief type, the combined trip valve and work piston causes the exhaust valve to open at a time other than the normal time and also assures that the work piston does not become locked.

The above-mentioned type vehicle-retarding, compression relief type engine braking systems are generally operatively associated with an arming switch on the dash of the vehicle, where it is accessible to a driver, so that the driver may arm the system, that is, ready the system for operation. Additional switches, generally in electrical series with the arming switch, are operatively positioned to be closed respectively whenever the clutch is engaged, whenever the transmission is in a position other than neutral, and/or whenever the throttle is positioned for a predetermined low engine speed or an idle engine speed or less.

The braking systems of the compression relief type can be combined with other engine braking systems, for example, systems in which combustion in the cylinders is interrupted and/or systems in which back pressure is created in the exhaust manifold. A vehicle retarding engine braking arrangement which combines all three types of systems is known from the U.S. Pat. No. 3,525,317 to Earl B. Muir entitled "Vehicle Engine Braking System" and granted Aug. 25, 1970.

Vehicle-retarding, engine braking systems of the compression relief type have come into widespread use on trucks, particularly on large trucks. The systems provide extra retarding power, reduce cost and allow drivers to achieve better vehicle performance and control. One such system, available for the Cummins L10 engine from the Jacobs Manufacturing Company of Bloomfield, Conn. under the designation 404 Jake Brake ® is said to provide as much as 350 retarding horsepower at the drive wheels for efficient slowing and good vehicle control. The probability of a runaway accident has been recognized as being about three times less were a truck equipped with a retarder; see Faucher et al. "Retarders for Heavy Vehicles: Phase II Field Evaluations", DOT HS No. 806 297, June 1982, page 75.

The known above-mentioned vehicle-retarding braking systems of the compression relief type are generally provided with an arming switch which, as noted above, is a manually operated ON-OFF switch positioned on the dashboard of a vehicle. The positioning of the switch on the dashboard, however, has distinct disadvantages because an operator must remove one of his hands from either the steering wheel of the vehicle or from the knob of the shift lever, in the event it is desired to arm the system while the vehicle is in motion. The actual arming is delayed, with possible serious consequences where road, load, weather or other environmental circumstances change while underway. Often, the operator, as well as the vehicle, is put in jeopardy, especially where the operator attempts to reach through the steering wheel to arm the vehicle. On the other hand, the "JAKE BRAKE" is intended for intermittent operation and is not intended to be "armed" continuously, especially in heavy traffic conditions.

Moreover, the prior art systems do not allow an operator to use the arming switch conveniently in such a way to effect intermittent use while the vehicle is being operated on a down-hill grade or the like, especially on slick surfaces.

SUMMARY OF THE INVENTION

An object of the present invention is to provide in a vehicle which has an auxiliary braking system, an improvement by which a driver may exercise the option of arming the system without the need for moving either hand from the steering wheel or shift lever.

Another object of the invention is to provide in a vehicle which has an auxiliary braking system an improvement which includes an arming device which may be used as a backup arming device, to be used whenever the main arming device has failed.

An additional object of the invention is to provide in a vehicle which has an auxiliary braking system, an improvement which includes a principal arming device and a backup arming device, which may be operated intermittently at the option of the driver without relinquishing control of either the steering wheel or shift lever.

A further object of the invention is to provide in a vehicle which has an auxiliary braking system, an improved arming device which is simple and inexpensive and also achieves the foregoing objects.

Yet another object of the present invention is to provide in a vehicle an improved auxiliary braking system, which allows a user to arm the system without removing his or her hands from the steering wheel and shift lever.

Yet an additional object of the invention is to provide, for a vehicle which has an auxiliary braking system, an arming device which may be added to the auxiliary braking system to provide a backup arming features.

Yet a further object of the invention is to provide a simple and inexpensive backup arming device which may be added to an auxiliary braking system of the compression relief type in a vehicle, preferably by means of a retrofit kit.

The present invention finds utility in a vehicle having an engine, a clutch pedal, an accelerator and a shift lever provided with a knob. The vehicle is equipped with an auxiliary braking system intended to effect engine compression relief and hence decelerate the vehicle at the option of a driver by letting up on the accelerator pedal with the clutch engaged (clutch pedal out). A switch means mounted at least in part on the knob arms the auxiliary braking system for use thereafter at the option of the driver.

The invention can also be seen as being in a vehicle having an engine, a transmission and a shift lever provided with a hand-engageable portion. The vehicle is equipped with an auxiliary braking system intended to decelerate the vehicle at the option of a driver. Switch means mounted at least in part on the hand-engageable portion of the shift lever arms the auxiliary braking system for use thereafter at the option of the driver.

From another vantage point, the invention is seen as being in a vehicle having an engine, a clutch pedal, an accelerator and a shift lever provided with a knob. The vehicle is equipped with an auxiliary braking system intended to effect engine compression relief and hence decelerate the vehicle at the option of a driver by letting up on the accelerator with the clutch pedal engaged. Enabling means for enabling the auxiliary braking system are included, the enabling means being energizable via a series electrical circuit including switch means responsive to position of the accelerator and switch means responsive to position of the clutch. An arming switch means mounted at least in part on the knob arms the auxiliary braking system for use thereafter at the option of the driver, the arming switch means mounted at least in part on the knob being electrically in series with the series electrical circuit.

From yet another viewpoint, the present invention can be viewed as being in a vehicle having an engine, a transmission, a clutch and a shift lever provided with a hand-engageable portion. The vehicle is equipped with an auxiliary braking system intended to decelerate the vehicle at the option of a driver and includes enabling means for enabling the auxiliary braking system. The enabling means is energizable via a series electrical circuit including switch means responsive to position of the clutch and switch means responsive to position of the shift lever. An arming switch means mounted at least in part on the hand-engageable portion of the shift lever arms the auxiliary braking system for use thereafter at the option of the driver.

The invention can also be seen as being in a vehicle having an engine, a transmission and hand-engageable means, including a steering wheel and a shift lever. The vehicle is equipped with an auxiliary braking system intended to decelerate the vehicle at the option of the driver. An arming switch means is mounted at least in part on the hand-engageable means for arming the auxiliary braking system at the option of the driver without removing his hands from either the steering wheel and/or the shift lever.

The arming switch means may comprise a microswitch mounted within the hand-engageable portion or knob of the shift lever which has a push-button activator protruding therefrom.

The arming switch means in a preferred embodiment includes a relay, the relay being operable by a microswitch.

The push-button desirably includes biasing means for positioning the push-button activator in a position which holds the arming switch means in a normally open condition in the absence of depression of the activator by a user.

The arming switch means is normally open and includes means on the knob of the shift lever which, when held by a user, effects closing of the arming switch means.

The arming switch means, in a preferred embodiment, is supplementary to and is in a parallel with an electrical circuit provided with a primary arming switch mounted on the dashboard of the vehicle.

The auxiliary braking system used in the present invention is a hydraulic system including at least one master valve. The means for enabling the auxiliary braking system includes a solenoid, the master valve being coupled to the solenoid and operated thereby.

The invention is also seen as an arming device for use in an auxiliary braking system of a vehicle which includes system enabling means, a series circuit for delivering enabling current to the enabling means and a shift lever having a hand-engageable portion. The device includes a push-button activator mounted on the hand-engageable portion of the shift lever and protrudes therefrom. Relay means respond to position of the push button-activator for selectively passing current to the series circuit at the option of a driver so as to arm the device.

The vehicle includes an accelerator pedal. Contacts of the relay means are connected in series with the series circuit, the series circuit including first switch means responsive to position of the accelerator and second switch means responsive to position of the clutch pedal.

A further switch means in electrical parallel with the relay contacts may alternatively pass current to the series circuit at the option of the driver.

DETAILED DESCRIPTION OF THE PREFERRED EMBODIMENT

Figure 1:
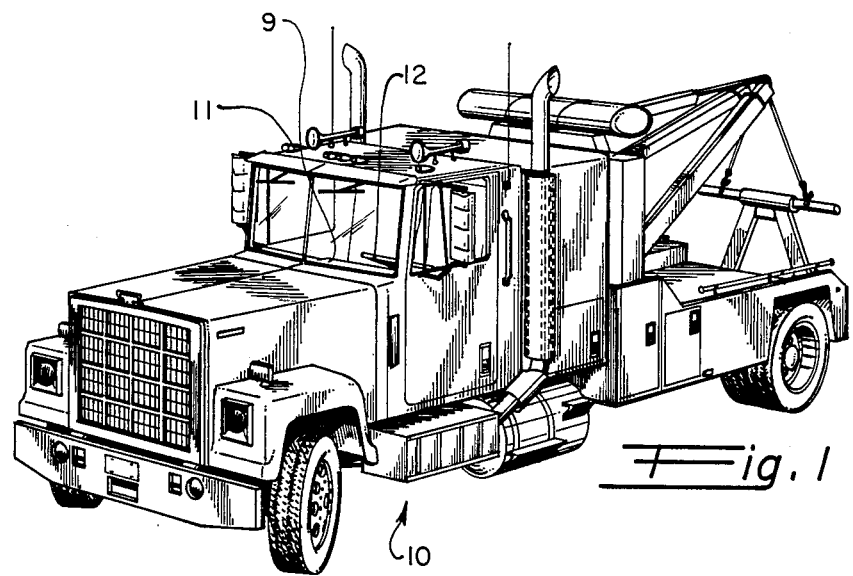
FIG. 1 is a pictorial view of a typical diesel powered truck into which the improved auxiliary braking system of the present invention may be incorporated.

In FIG. 1 a diesel-powered tow truck of conventional configuration is designated generally by the numeral 10, the truck having an operator's cab 11. The truck 10 is an example of the type of vehicle which may be desirably equipped with an auxiliary engine braking system which is improved in accordance with the present invention. It is to be appreciated that the present invention can be incorporated into vehicles of other types, including gasoline-powered vehicles, and into tractors, tractor-trailers and the like, be the vehicles gasoline-powered or diesel-powered. The vehicle 10 is provided with a conventional steering wheel 12 and a dashboard 9.

Figure 2:
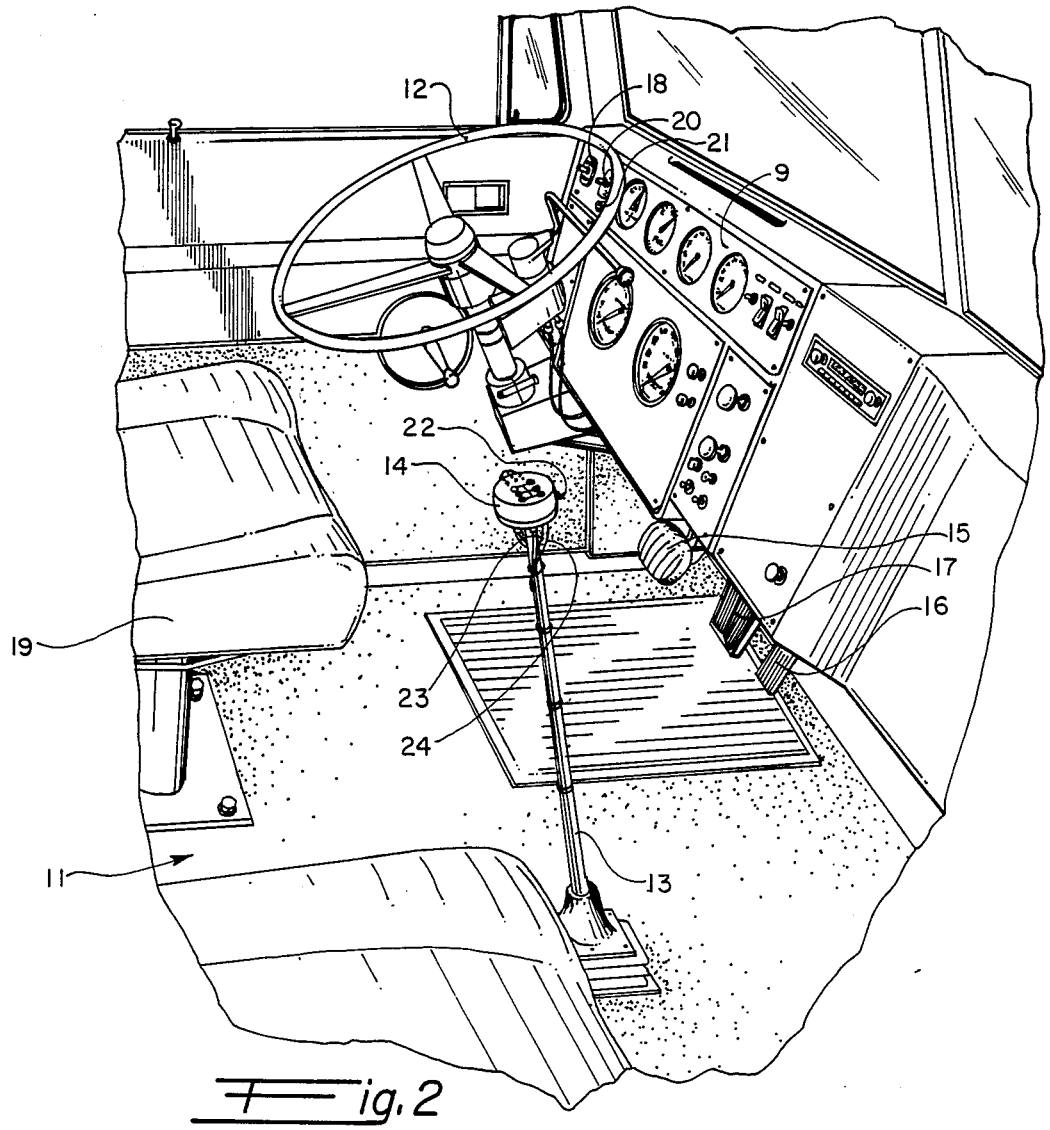
FIG. 2 is an exemplary, simplified, perspective, view of the interior of a cab of a diesel-powered truck into which the improved auxiliary braking system of the present invention has been incorporated, an activator of a microswitch being visible on a knob of a shift lever in accordance with the present invention.
Figure 3:
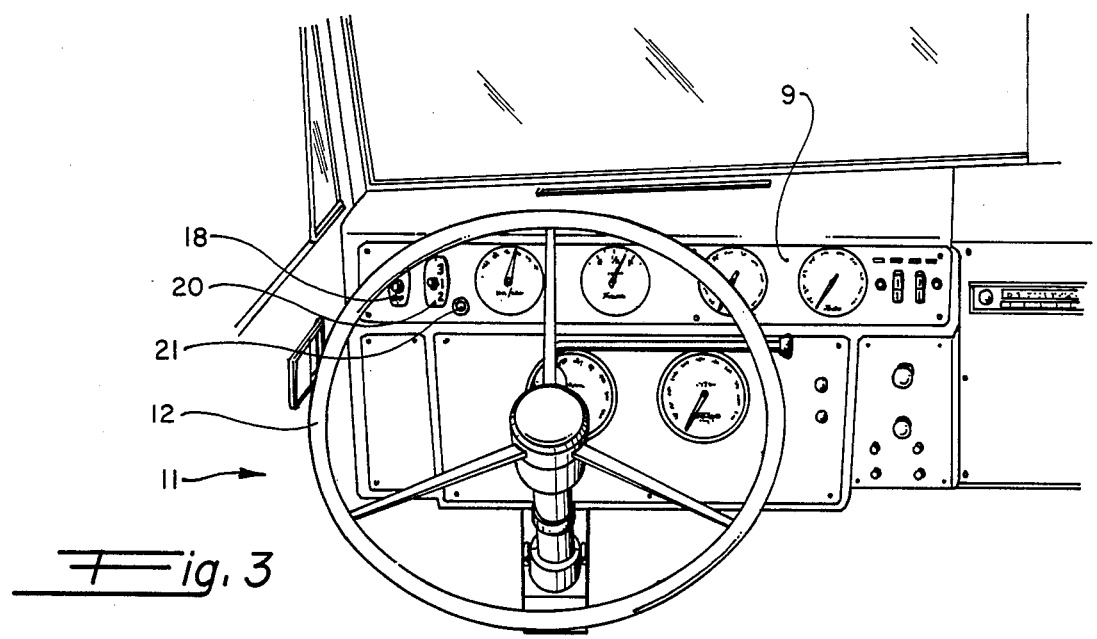
FIG. 3 is a pictorial view of a portion of the dashboard of the diesel-powered truck shown in FIG. 2, a dashboard-mounted principal arming switch, three-position braking-level switch and indicator light being visible.

The interior of the cab 11, partially illustrated in FIGS. 2 and 3 is in large measure of conventional appearance. The conventional steering wheel 12, a shift lever 13 provided with a hand-graspable knob 14, a clutch pedal 15 and an accelerator pedal 16 are provided as is a brake pedal 17. An operator's seat 19 is mounted in the vicinity of the steering wheel 12. The vehicle 10, having been provided with an auxiliary braking system of the compression relief type, is provided with a principal, ON-OFF, arming, toggle switch 18 mounted on the dashboard 9 in the vicinity of the left edge thereof behind the steering wheel 12. An exemplary three-position auxiliary braking-level selecting switch 20 is also mounted on the dashboard 9 in the illustrated example, as seen in FIGS. 2 and 3. It is to be appreciated that in some instances only one toggle switch would be used. For example, when only one auxiliary braking level is provided, only the arming toggle switch 18 need be provided. In instances when two auxiliary braking levels are to be provided, one three-position toggle switch would be required, it effecting both the ON-OFF function; and the braking level selection as well, in this case between two braking levels, in the first (OFF position) the selected auxiliary braking level would be zero and the system would not be armed. An indicator light 21, which may be an LED, may be mounted on the dashboard in the vicinity of the switches 18 and 20 for the purpose of indicating current flow in the auxiliary braking system electrical circuit, thereby providing a visual indication of an armed condition of the auxiliary braking system.

Figure 4:
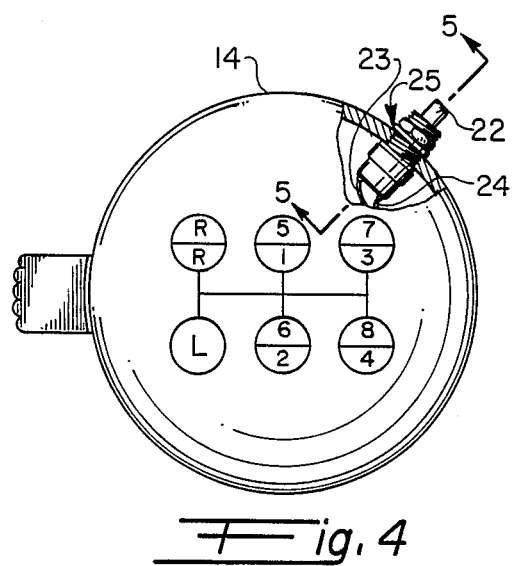
FIG. 4 is a top plan view of the knob of the shift lever shown in FIG. 2, the knob being partially broken away to expose the microswitch and its connections to view.
Figure 5:
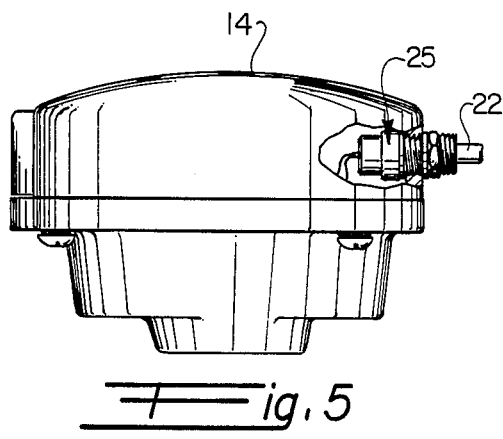
FIG. 5 is a side plan view of the knob of the shift lever visible in FIGS. 2 and 4, the knob being partially broken away to expose the microswitch and its connections to view.
Figure 8:
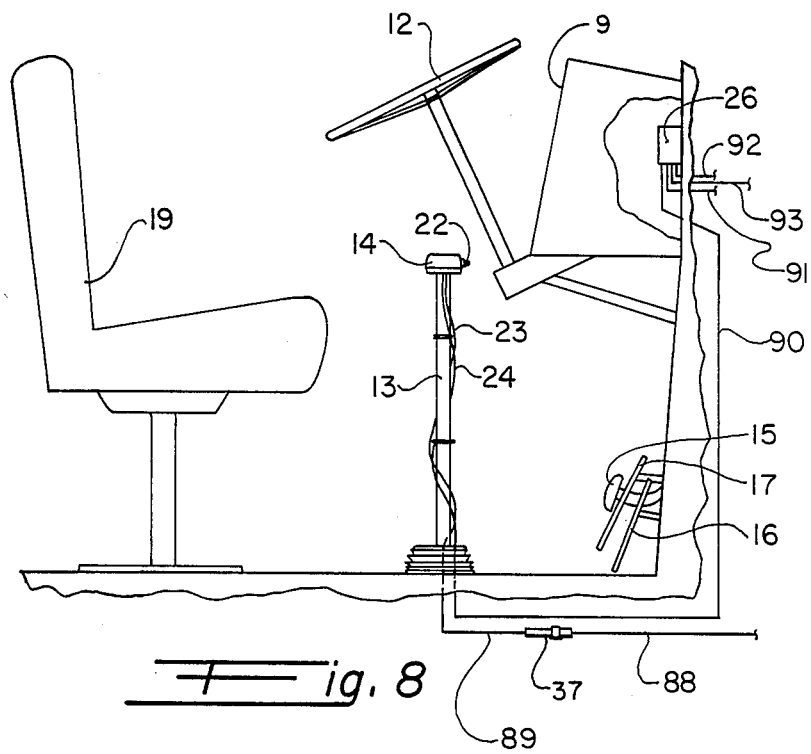
FIG. 8 is a simplified, somewhat diagrammatic illustration of the circuitry shown in FIG. 7, illustrating the physical placement of components of the circuitry in the cab of a vehicle in relation to the shift lever and dashboard.

A microswitch 25, as illustrated in FIGS. 4 and 5 in accordance with an exemplary example of the present invention, is mounted within the hand-graspable knob 14, its spring-biased actuating button 22 extending outwardly from the knob 14, providing means by which the driver of the vehicle 10 can arm the auxiliary braking system and disarm the system, without removing his hands from the steering wheel 12 and the knob 14, the microswitch functioning as supplement to the primary arming switch 18. As illustrated in FIGS. 2 and 4, a pair of leads 23, 24 extend from the microswitch 25 within the knob 14 for the purpose of supplying current to a relay 26 (not visible in FIG. 1), the relay being desirably mounted behind the dashboard 9, as illustrated in FIG. 8.

Briefly, referring to FIG. 3, the positioning of the principal arming toggle switch 18 and the three-position, braking level selecting toggle switch 20, on the dashboard 9 in the cab 11 of the vehicle 10 relative to the steering wheel 12 is seen from the viewpoint of the driver. It is clear that the switches 18 and 20 as illustrated are so positioned that the driver, were the driver to wish to arm the auxiliary system or to set the braking level of the auxiliary system differently, he or she would need to remove a hand from the steering wheel 12 and reach over the steering wheel or reach between the spokes of the steering wheel. In either case both the safety of the vehicle and the driver, were the vehicle to be underway, would be at serious risk, constituting a dangerous shortcoming and disadvantage. Moreover, were the driver to wish to disarm momentarily or for short periods the auxiliary braking system while underway, as when road conditions are such that skidding may result during a down hill run, again he or she would need to reach over the steering wheel or between its spokes to effect the change. By providing a supplemental arming circuit, which includes the microswitch 25 having its spring-biased operating button 22 extending out of the knob 14 of the shift lever 13, arming and disarming of the auxiliary braking system can be easily effected without removing ones hands from either the steering wheel or shift lever, providing a high and improved level of safety and greater flexibility.

Figure 6:
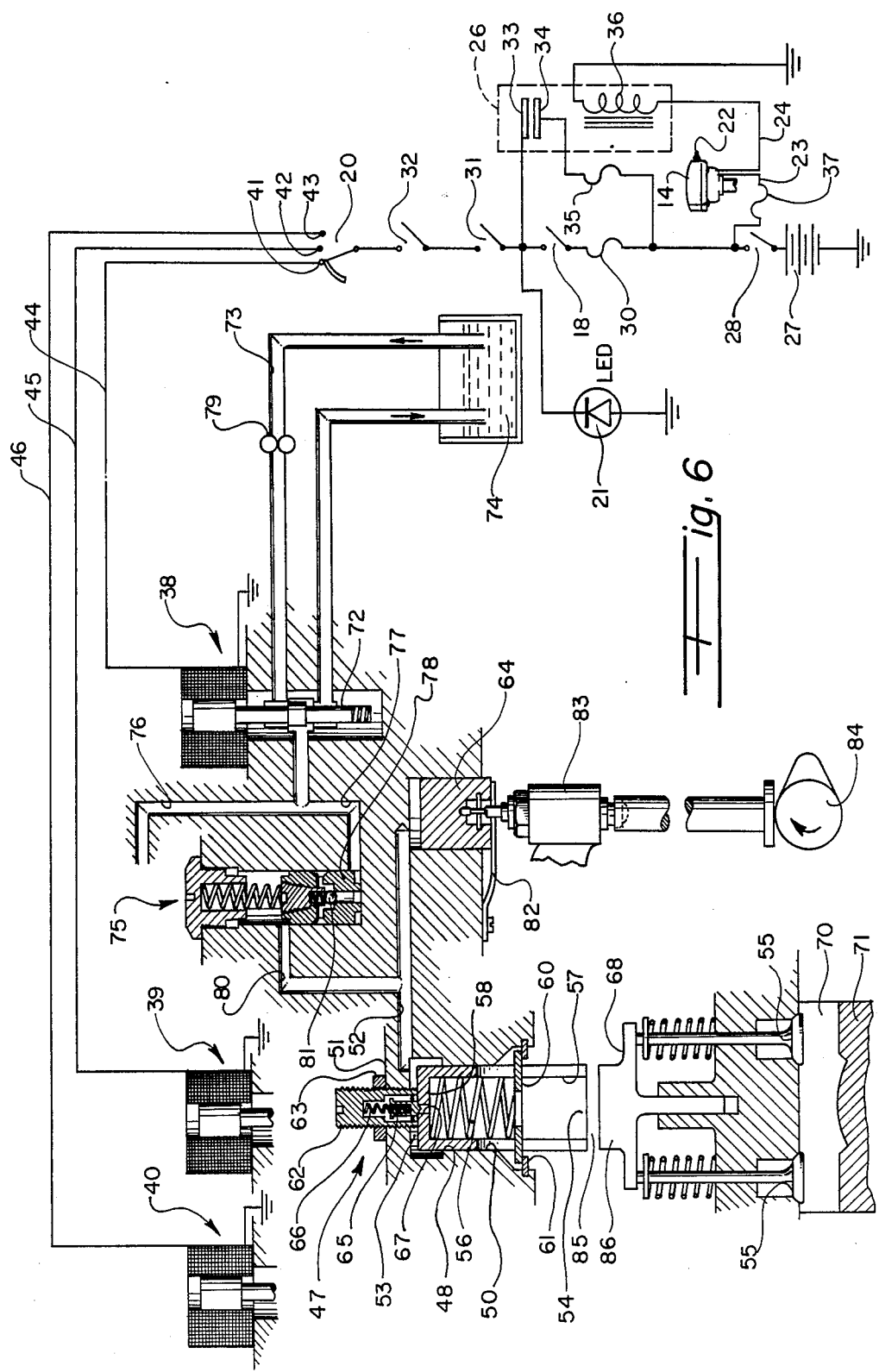
FIG. 6 is a schematic diagram illustrating a preferred embodiment of an improved auxiliary braking system of the compression relief type in a diesel engine, in accordance with a practical application of the present invention, showing the improved arming circuitry thereof.

As illustrated in FIG. 6, an exemplary improved auxiliary braking system of the compression relief type in accordance with the present invention includes, as conventional circuit components, a battery 27, an ignition switch 28, a fuse 30, the principal arming switch 18, a normally closed clutch-position-responsive switch 31, a normally open throttle switch 32 (responsive to position of the throttle pedal, the throttle per se or the fuel pump ON-OFF condition) and the three-position auxiliary braking system braking level selecting switch 20 connected in electrical series. The normally closed switch 31 is closed whenever the clutch is engaged, opening whenever the clutch is disengaged. The normally open switch 32 is open whenever the driver either depresses the accelerator pedal or calls for power by opening the throttle per se or effects energization of the fuel pump, as the cases may be. The switch 32 closes whenever the throttle pedal is not depressed beyond a given position, the throttle is not opened beyond a given point or the fuel pump is deenergized, as the cases may be. The LED 21 is connected in parallel with the switch 18, the fuse 30, the switch 28 and the battery 27, thereby providing a visual indication of whether or not the auxiliary braking system is armed.

In accordance with a realized embodiment of the present invention, the relay 26, which is mounted conveniently on the back of the dashboard 9 (FIG. 8) has its pair of current-carrying, normally open contacts 33, 34 connected in electrical series with a fuse 35, this series circuit being connected in electrical parallel with the series connection of the fuse 30 and the principal arming switch 18. The relay 26 includes a coil 36 which, when energized, causes the pair of contacts 33, 34 to close. The coil 26 receives its energizing current via the microswitch 25 (FIGS. 4 and 5), which is mounted within the knob 14 of the shift lever, via the leads 23 and 24, one end of the coil 36 being electrically connected to the lead 24 and its other end being connected to circuit ground. A fuse 37 is desirably placed in series between the lead 23 and the ignition switch 28.

The electrical circuit is completed by the respective coils of three solenoid valves 38, 39 and 40, one end of each of these coils being connected to electrical circuit ground, while the respective other ends of the coils are electrically connected to respective contacts 41–43 of the braking level selecting switch 20 via respective leads 44–46. In a first position of the switch 20 only the coil of solenoid valve 38 may be energized, in its second position the coils of both the solenoid valves 38 and 39 may be energized and its third position the coils of all the solenoid valves 38–40 may be energized. Were the vehicle in which the exemplary auxiliary braking system of the present invention placed powered by a six cylinder engine, each of the solenoid valves 38–40 would effect the converting of a respective pair of the cylinders from a combustion mode into a compression relief mode. Thus, auxiliary braking force may be provided at three different levels, either two, four or six cylinders can be made to function in the compression relief mode at the option of the driver.

As shown in FIG. 6, the auxiliary braking system includes a safety trip valve unit 47 associated with a hydraulically operable work piston 48. The piston 48 is reciprocable in a cylinder 50 of a stationary block 51. High pressure hydraulic fluid moving from a passage 52 of the block to a clearance 53 in the cylinder above the piston 48 serves to force the piston 48 downward upon a work stroke. In this action, the piston 48 is projected downward relative to an open bottom end 54 of the cylinder 50 to actuate a device which effects the opening of an exhaust valve or valves 55 of one of the six cylinders in the engine. When the hydraulic pressure over the piston 48 is relaxed, a compression spring 56 operates to return the piston to its normal position. Extending into the piston 48 from its bottom end is a recess 57 in which the spring 56 is positioned between a head wall 58 of the piston and an annular slide plate 60. The latter is formed with lugs which extend radially through slots of the piston 48 and abut a retainer ring 61 mounted in the block 51. These slots are elongated vertically above the lugs so as to enable the piston 48 to reciprocate in its cylinder 50 relative to the lugs.

The safety trip value unit 47 includes a housing, defined by a cylindrical screw 62. The latter is threadedly engaged in an aperture extending through block 51 axially into the top end of the piston cylinder 50. The screw 62 is adjustable in the aperture so as to depend for a selected distance into the piston cylinder above the piston 48. An external lock nut 63 serves to lock the adjusted position of the screw 62. The depending end of the screw 62 limits movement of the piston 48 to a returned normal position wherein it is spaced by clearance 53 from the head wall of the piston cylinder 50. This clearance 53 may be reduced or increased as desired by axial adjustment of the screw 62 without affecting the constant trip distance.

The safety trip valve unit 47 is intended to have two purposes. It controls the initial or starting position of piston 48 as well as the total allowable stroke of the piston. The stroke of piston 48 during normal operation is controlled by other means, such as the stroke of a master piston 64. It is only during some malfunctioning of the piston 48 that the safety trip valve unit 47 comes into operation to limit the total movement of the piston 48 from a predetermined adjustable upper position. The tripping distance or safety stroke limitation is built into the dimensions of the trip valve unit 47 itself and is ideally a few thousandths of an inch more than the normal operating stroke of the piston 48 as determined by the master piston 64. The tripping distance is independent of the starting position of the piston 48. To this end, the screw 62 is hollow or provided with an axial bore in its bottom end. A trip valve 65 of cup-form having a loose fit in this bore is axially movable relative to the bottom end of the bore. A spring 66 seated in the cup of the valve and abutting an overhead wall of bore constantly urges the valve 65 outwardly of the bore. A flange about the upper end of the valve 65 is cooperable with a retainer ring or stop mounted in the screw 62 near the mouth of the bore to limit the extent of outward movement of the valve 65. A nub of conical form depending axially from the bottom face of the valve 65 provides initial alignment of the valve so that the face of the valve seats itself squarely over a spill-hole 67 formed axially in the piston 48. The nub also provides sufficient alignment to prevent rubbing of the valve 65 against the bore or lock ring during normal operation. The seating of the face of the valve 65 against the top of the piston 48 prevents discharge or dumping of hydraulic fluid from clearance 53 into the interior recess of the piston 48 which is open to sump.

In operation, hydraulic fluid pressurized into the clearance 53 above the piston 48 sufficiently to overcome the resistance of the piston spring 56 plus external work resistance, such as engine compression pressure on exhaust valve area and exhaust valve springs, forces the piston 48 downward on a work stroke. The pressure of hydraulic fluid from the clearance 53 entering through the end slots (not shown) of the screw 62 to the bore around the trip valve forces the latter to follow the downward movement of the piston 48 and at the same time holds the valve seated in sealing relation over the spill-hole 67. When the hydraulic pressure in clearance 53 is relaxed, the piston spring 56 re-expands to return the piston 48 and the trip valve 63 to normal against the resistance of the valve spring 66 and oil supply pressure, the trip valve 63 remaining seated over the spill-hole 67 during this movement. The trip valve 63 has a normal returned condition wherein its peripheral flange is elevated a pre-set distance above the retainer ring, independent of the adjustable clearance 53. Accordingly, this distance determines the extent to which the trip valve 63 can follow a downstroke movement of the piston 48; and it also prescribes a distance of safe downstroke movement for the piston. It is apparent that if the trip valve 63 should move sufficiently to limit upon the retainer ring during a downstroke of the piston 48, slight further movement of the piston would separate the piston from the trip valve and causes the valve 63 to become unseated from the spill-hole 67. When this occurs, the hydraulic pressure acting over the piston 48 will suddenly relax and the piston will be disabled from further downstroke movement as the hydraulic fluid is dumped through the spill-hole 67 into the interior of the piston 48 and allowed to escape from the open bottom and slots of the piston to sump.

The illustrated braking system embodying the invention functions at the will of the operator of the vehicle to force the work piston 48 on a work stroke to actuate an exhaust valve unit 68 of a cylinder 70 of the engine to open condition at or near the end of a compression stroke of a related piston 71 of the engine. This will relieve the engine's cylinder 70 of gases of compression, and thereby will avoid transmission of the expanding power of the compressed gases to the engine. Use of this braking system in normal operation tends to advantageously slow the engine.

When a solenoid valve 38 is actuated in this braking system its operator 72 exhibits an open condition, hydraulic fluid or oil is forced over a supply passage 73 from the crankcase 74 by a continuously operating pump 79 through the solenoid valve operator 72 to a control valve unit 75, as well as to a second control valve unit (not shown) via a fluid passageway 76, the second control valve being associated with a second work piston corresponding to the piston 48. Fluid entering a passage 77 leading to the control valve unit 75 slides a valve member 78 upwardly to communicate a high pressure line 80 through a check valve 81 with the passageway 77. When this occurs, operating hydraulic fluid passes through the check valve 81 to fill the high pressure line 80. The latter is common to the upper end of a master piston cylinder 64 and to the clearance 53 above the work piston 48. The latter may appropriately be called a slave of a master piston 64 operating in the master piston cylinder. A return spring 82 of the master piston 64 is relatively weaker than spring 56 of the work piston 48; accordingly, the master piston 64 is hydraulically moved by pressure of fluid in passage 52 over a normal slight clearance (not shown) and held in contact with an end of the usual fuel injector rocker arm 83 of the vehicle's engine or other suitably timed moving part. When a constantly rotating cam shaft 84 of the engine operates during a fuel intake stroke of the engine to pivot the injector rocker arm 83, the master piston 64 is forced upwardly. The hydraulic fluid imprisoned by check valve 81 in the high pressure line 52 is pressurized in the clearance 53 over the work piston 48 by this movement of the master piston 64. Whereupon this action, the work piston 48 is forced down over a slight normal clearance 85 against the crosshead 86 of the exhaust valve unit 68 to force the latter to an open condition. The exhaust valve unit 68 is timely opened in this action at or near the end of the compression stroke of the related piston 71 to exhaust the gases of compression from the engine's cylinder 70. As the pressure of the cam shaft 84 upon the injector rocker arm relaxes, the work piston spring 82 returns the work piston 64 to normal. The trip valve 65 follows the reciprocating movement of the work piston 48. In the normal reciprocating movement of the work piston 48 during normal operation of the braking system, the work piston does not move over a range exceeding a distance corresponding to the normal spacing between the flange of the trip valve 65 and the retainer ring.

It can be seen that if for some reason, such as breaking of its return spring 56, the work piston 48 did not fully return, further oil will flow through the check valve 81 to fill the void developing in the high pressure line 52 because of failure of the work piston 48 to fully return while the master piston 64 continues to retract. If this fault continued as the engine is rapidly cycled, the work piston 48 would be hydraulically locked, or "jacked" down further as additional oil accumulated in the high pressure line; and, unless this "jacking" action were timely stopped, the associated exhaust valve or valves 55 might be hydraulically locked in an open condition or projected harmfully into the path of the related reciprocating piston 71 of the engine. The trip valve 65 serves to prevent the work piston 48 from becoming hydraulically locked or moving down to a dangerous condition. The trip valve 65 will limit upon the retainer ring when the work piston 48 moves beyond its prescribed range; and the work piston will separate from the trip valve and become disabled, as earlier explained, before it can be "jacked" down to a dangerous condition. Oil "dumped" through the spill-hole 67 will escape through the bottom and slide slots of the work piston 48 to the crankcase 74. The operating deficiencies of the normal braking system will be readily sensed by the operator shortly after they develop. He will then stop his vehicle as soon as it is expedient to do so and will take steps to repair the fault. It is to be noted that the size of the clearance 53 may be selectively adjusted by making an axial adjustment of screw 62, without affecting the constant tripping distance.

As set out above, the exemplary auxiliary braking system includes a second control valve unit (corresponding to the first control valve unit 75) which receives fluid from the fluid passageway or line 76 for the purpose of feeding fluid to a second work piston (corresponding to work piston 48) so as to effect the opening of the exhaust valve or valves of a second engine combustion cylinder (corresponding to the cylinder 70) under the control of a master piston (corresponding to the master piston 64) which, in turn, would be controlled by a rocker arm (corresponding to the rocker arm 83). The first control valve unit 75 and the second control valve unit are controlled by the solenoid valve 38 which receives its energizing current via the braking-level-selecting, three-position switch 20 when it is in any of its three positions, provided (1) that the clutch-position-responsive switch 31 is closed (reflecting that the clutch is engaged), (2) that the throttle switch 32 is closed (reflecting position of throttle, throttle pedal or fuel pump energization when little or no power is being called for), and (3) that either the principal arming switch 18 has been closed or the relay contacts 33, 34 of the supplemental arming switching arrangement has been closed. Under these conditions, two of the cylinders of a six-cylinder engine would operate in the compression relief mode, providing a first level of auxiliary braking.

Were the aforementioned switch conditions to prevail and were the switch 20 to be moved into its second position, the first solenoid valve 38 would remain energized and the second solenoid valve 39 would also be energized, its associated two control valves would supply oil to high pressure lines so that two additional cylinders would operate in the compression relief mode. A second level of auxiliary braking would prevail.

Were the switch 20 to be moved into its third position, were the other aforementioned switching conditions to prevail, the third solenoid valve 40 also would be energized and the solenoid valves 38 and 39 would remain energized and all six of the cylinders of the engine would operate in the compression mode. A third level of auxiliary braking would be achieved.

The solenoid valves 39 and 40 are associated with respective additional control valves (each corresponding to the valve 75) each of which is operatively associated with a respective further master piston (each corresponding to the piston 64) and a respective work piston (each corresponding to the work piston 48).

Figure 9:
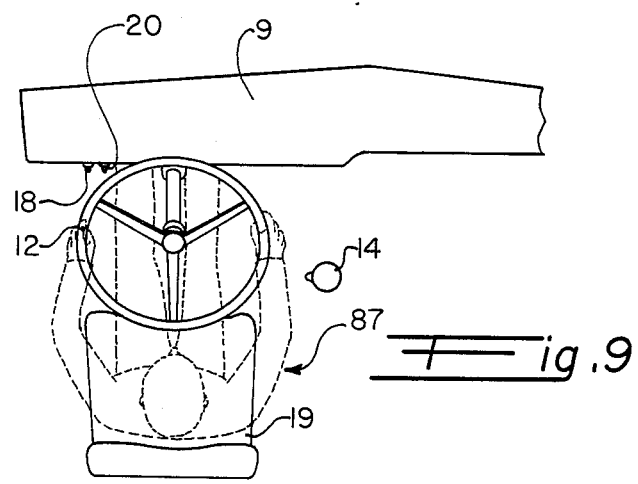
FIGS. 9-11 are respective diagrammatic representatives of a portion of the interior of the cab of FIG. 2, showing respectively an operator's arm positions for non-braking running, conventional arming while underway and arming in accordance with the present invention.
Figure 10:
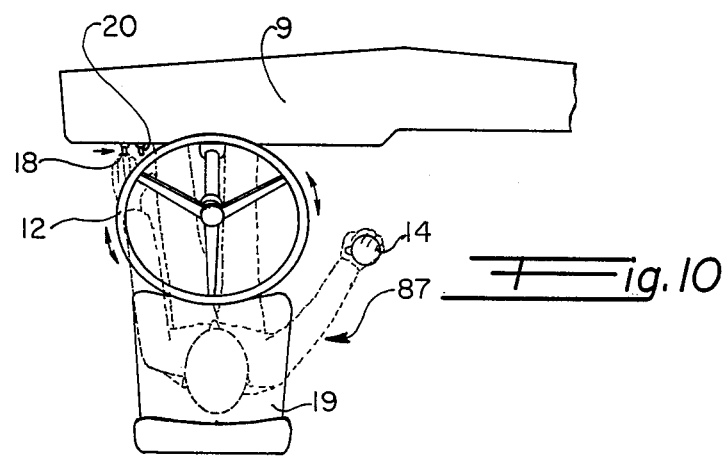
Figure 11:
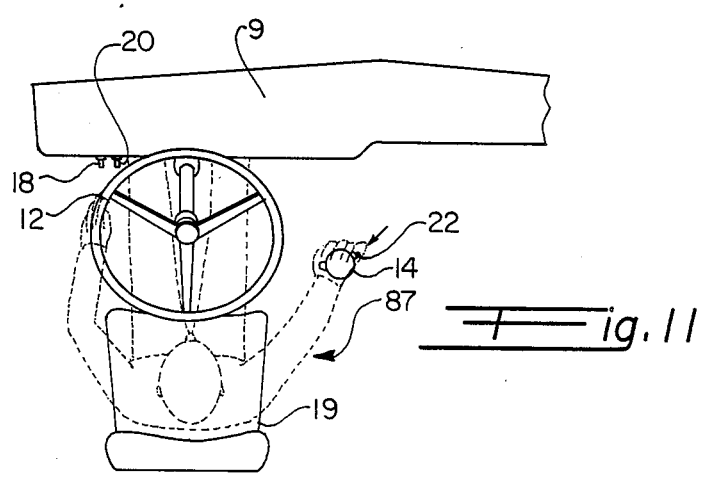

Referring briefly to FIG. 2 and FIGS. 9-11, it can be seen that a driver, shown in phantom and designated generally by the numeral 87 in FIGS. 9-11, when seated on the operator's seat 19, in a vehicle having a conventional auxiliary braking system would generally operate the vehicle with both of his hands on the steering wheel 12, as shown in FIG. 9. Were he or she to encounter driving conditions, as on a down-hill grade, and desire to operate the auxiliary braking system only to discover the system was not armed, he would have to remove his left hand from the steering wheel 12, as illustrated in FIG. 10 to manipulate the arming switch 18 on the dashboard 9 and, very likely, move his or her right hand to the knob 14 of the shift lever to effect down shifting. Clearly, this is a precarious arrangement. On the other hand, were the driver to be operating a vehicle equipped with the improved auxiliary braking system of the compression relief type of the present invention, he or she would not need to remove the left hand from the steering wheel 12 or the right hand from the knob 14 of the shift lever to arm the system. Rather, the driver would as shown in FIG. 11, simply depress the button 22 extending outwardly from the knob 14 of the shift lever. Moreover, were the driver to wish to intermittently arm and disarm the system, as the vehicle descended a down grade, he could alternately depress and release the button 22, in effect turning the system ON and OFF, without the need for disengaging the clutch or feeding fuel to the engine. Considerable flexibility results. Shifting conditions are also improved and better vehicle control achieved.

Figure 7:
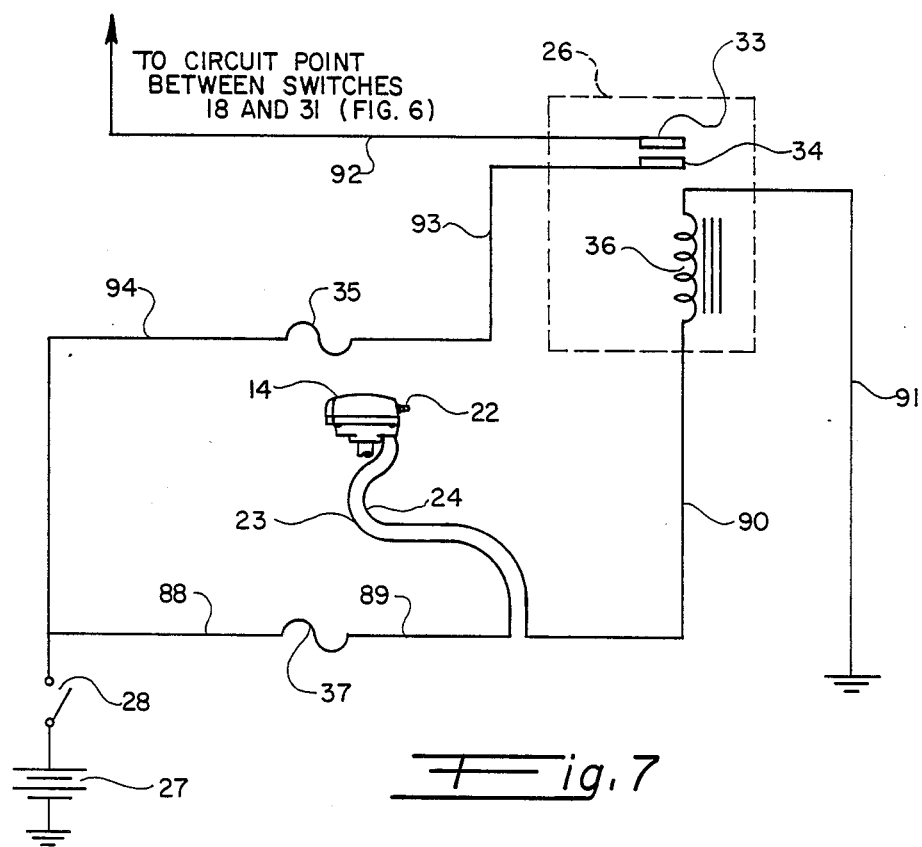
FIG. 7 is a schematic diagram of a portion of the circuitry shown in FIG. 6, illustrating how the modified arming device may be readily incorporated into known auxiliary braking systems in accordance with the present invention.

Existing auxiliary braking systems can be modified very easily to incorporate the present invention therein using the circuit illustrated schematically in FIG. 7, and physically arranged as shown in FIG. 8.

Turning to FIG. 7, in conjunction with FIG. 8, it is to be clear how existing auxiliary braking systems may be modified in accordance with the present invention. The vehicle includes the conventional battery 27 and the conventional ignition switch 28. The exemplary novel circuit of the present invention, as illustrated, includes a conductive lead 88 extending from the ignition switch 28 to one end of the fuse 37. The other end of the fuse 37 is connected, via a conductive lead 89 to the lead 23 which, with the lead 24, may be wrapped about the shift lever 13 (FIG. 8) providing a series electrical circuit to and from the microswitch 25 (FIGS. 4, 5) housed within the knob 14. The leads 23 and 24 are desirably formed of respective flexible multistrand copper wires encapsulated and spaced apart within a flexible plastic electrical insulating material. The lead 24 is connected to a conductive lead 90 which is connected to one terminal of the coil of the relay coil 36 of the relay 26. A conductive lead 91 connects the other terminal of the coil 36 to system ground. The relay 26 is mounted behind the dashboard 9 (FIG. 8), its contact 33 being conductively connected, via a lead 92 to a circuit point between the switches 18 and 31 (FIG. 6). The contact 34 of the relay 26 is conductively connected to a circuit point between the ignition switch 28 and the fuse 30 via a series connection of a conductive lead 93, the fuse 35 and a conductive lead 94.

It is to be appreciated that the foregoing discussion and accompanying drawings relate to exemplary embodiments set out by way of illustration, not by way of limitation. Other embodiments and variants may be realized without departing from the spirit and scope of the present invention, its scope being defined in the appended claims.

What is claimed is:

1. In a vehicle having an engine, a clutch pedal, an accelerator pedal and a shift lever provided with a knob, and wherein the vehicle is equipped with an auxiliary braking system including a primary arming switch and intended to effect engine compression relief and hence decelerate the vehicle at the option of a driver by letting up on the accelerator pedal with the clutch engaged, an improvement which comprises supplemental arming switch means mounted at least in part on the knob of the shift lever and in electrical parallel with said primary arming switch for arming the auxiliary braking system for use thereafter at the option of the driver.

2. The improvement of claim 1, wherein the supplemental arming switch means comprises a microswitch mounted within the knob of the shift lever and having a push-button activator protruding therefrom.

3. The improvement of claim 2, wherein the supplemental arming switch means includes a relay, the relay being operable by said microswitch.

4. The improvement of claim 2, wherein the microswitch includes biasing means for positioning the push-button activator in a position which holds the supplemental arming switch means in a normally open condition in the absence of depression of the activator by the driver.

5. The improvement of claim 1, wherein said supplemental arming switch means is normally open, and includes means on the knob of the shift lever which when held by the driver effects closing of the supplemental arming switch means.

6. The improvement of claim 1, wherein said primary arming switch is mounted on the dashboard of the vehicle.

7. The improvement of claim 1, including a throttle-operated switch and a clutch-operated switch in electrical series with one another and with the supplemental arming switch means.

8. The improvement of claim 1, including a fuel pump-operated switch and a clutch-operated switch in electrical series with one another and with the supplemental arming switch means.

9. In a vehicle having an engine, a transmission and a shaft lever provided with a hand-engageable portion, and wherein the vehicle is equipped with an auxiliary braking system including a primary arming switch and intended to decelerate the vehicle at table option of a driver, an improvement which comprises supplemental arming switch means mounted at least in part on the hand-engageable portion of the shift lever and in electrical parallel with said primary arming switch for arming the auxiliary braking system for use thereafter at the option of the driver.

10. The improvement of claim 9, wherein the supplemental arming switch means comprises a microswitch mounted within the hand-engageable portion of the shift lever and having a push-button activator protruding therefrom.

11. The improvement of claim 10, wherein the supplemental arming switch means includes a relay, the relay being operably by said microswitch.

12. The improvement of claim 10, wherein the microswitch includes biasing means for positioning the push-button activator in a position which holds the supplemental arming switch means in a normally open condition in the absence of depression of the driver.

13. The improvement of claim 9, wherein said supplemental arming switch means is normally open, and includes means on the hand-engageable portion which when held by a user effects closing of the supplemental arming switch means.

14. The improvement of claim 9, wherein the primary arming switch is mounted on the dashboard of the vehicle.

15. The improvement of claim 9, including a throttle-operated switch and a clutch-operated switch in electrical series with one another and the supplemental arming switch means.

16. The improvement of claim 9, including a fuel-pump-operated switch and a clutch-operated switch in electrical series with one another and with the supplemental arming switch means.

17. In a vehicle having an engine, a clutch pedal, an accelerator pedal and a shift lever provided with a knob, and wherein the vehicle is equipped with an auxiliary braking system including a primary arming switch and intended to effect engine compression relief and hence decelerate the vehicle at the option of a driver by letting up on the accelerator pedal with the clutch engaged and including means for enabling the auxiliary braking system, the enabling means being energizable via a series electrical circuit including switch means responsive to position of the accelerator pedal and switch means responsive to position of the clutch pedal, an improvement which comprises supplemental arming switch means mounted at least in part on the knob and in electrical parallel with said primary arming switch for arming the auxiliary braking system for use therafter at the option of the driver, the supplemental arming switch means mounted at least in part on the knob being electrically in series with the series electrical circuit.

18. The improvement of claim 17, wherein the supplemental arming switch means comprises a microswitch mounted within the knob and having a push-button activator protruding therefrom.

19. The improvement of claim 18, wherein the supplemental arming switch means includes a relay, the relay being operable by said microswitch.

20. The improvement of claim 18, wherein the microswitch includes biasing means for positioning the push-button activator in a position which holds the supplemental arming switch means in a normally open condition in the absence of depression of the activator by the driver.

21. The improvement of claim 17, wherein said supplemental arming switch means is normally open, and includes means on the knob which when held by a user effects closing of the supplemental arming switch means.

22. The improvement of claim 17, wherein the primary arming switch is mounted on the dashboard of the vehicle.

23. The improvement of claim 17, wherein the auxiliary braking system is a hydraulic system including at least one solenoid valve, and wherein the means for enabling the auxiliary braking system includes at least one control valve, the control valve being coupled to the solenoid valve.

24. The improvement of claim 23, including at least one slave piston and at least one master piston, a fluid communicating means extending between said slave piston and said master piston, said fluid communicating means being positioned to be charged with fluid via said control valve.

25. The improvement of claim 17, including a throttle-operated switch and a clutch-operated switch in electrical series with one another and with the supplemental arming switch means.

26. The improvement of claim 17, including a fuel-pump-operated switch and a clutch-operated switch in series with one another and with the supplemental arming switch means.

27. In a vehicle having an engine, a transmission, a clutch and a shift lever provided with a hand-engageable portion, and wherein the vehicle is equipped with an auxiliary braking system including a primary arming switch intended to decelerate the vehicle at the option of a driver and including enabling means for enabling the auxiliary braking system, the enabling means being energizable via a series electrical circuit including switch means responsive to position of the clutch pedal and switch means responsive to position of the accelerator pedal, an improvement which comprises supplemental arming switch means mounted at least in part on the hand-engageable portion of the shift lever and in electrical parallel with said primary arming switch for arming the auxiliary braking system for use thereafter at the option of the driver, the supplemental arming switch means being in electrical series with said series electrical circuit.

28. The improvement of claim 27, wherein the supplemental arming switch means comprises a microswitch mounted within the hand-engageable portion of the shift lever and having a push-button activator protruding therefrom.

29. The improvement of claim 28, wherein the supplemental arming switch means includes a relay, the relay being operable by said microswitch.

30. The improvement of claim 28, wherein the microswitch includes biasing means for positioning the push-button activator in a position which holds the supplemental arming switch means in a normally open condition in the absence of depression of the activator by the driver.

31. The improvement of claim 27, wherein said supplemental arming switch means is normally open, and includes means on the hand-engageable portion of the shift lever which when held by the driver effects closing of the supplemental arming switch means.

32. The improvement of claim 27, wherein the primary arming switch is mounted on the dashboard of the vehicle.

33. The improvement of claim 27, wherein the auxiliary braking system is a hydraulic system including at least one solenoid valve, and wherein the means for enabling the auxiliary braking system includes at least one control valve, the control valve being coupled to the solenoid valve.

34. The improvement of claim 33, including at least one slave piston and at least one master piston, fluid communicating means extending between said slave piston and said master piston, said fluid communicating means being positioned to be charged with fluid via said contorl valve.

35. The improvement of claim 27, incuding a throttle-operated switch and a clutch-operated switch in electrical series with one another and with the supplemental arming switch means.

36. The improvement of claim 27, including a fuel-pump-operated switch and a clutch-operated switch in electrical series with one another and with the supplemental arming switch means.

37. In a vehicle having an engine, a transmission and hand-engageable means including a steering wheel and a shift lever, and wherein the vehicle is equipped with an auxiliary braking system including a primary arming switch intended to decelerate the vehicle at the option of a driver, an improvement which comprises supplemental arming switch means mounted at least in part on the hand-engageable means and in electrical parallel with said primary arming switch for arming the auxiliary braking system for use thereafter at the option of the driver without removing his hands from either the steering wheel and/or the shift lever.

38. The improvement of claim 37, wherein the supplemental arming switch means comprises a microswitch mounted within the hand-engageable means and having a push-button activator protruding threfrom.

39. The improvement of claim 38, wherein the supplemental arming switch means includes a relay, the relay being operable by said microswitch.

40. The improvement of claim 38, wherein the microswitch includes biasing means for positioning the push-button activator in a position which holds the supplemental arming switch means in a normally open condition in the absence of depression of the activator by the driver.

41. The improvement of claim 37, wherein said supplemental arming switch means is normally open, and includes means on the hand-engageable means which when held by the driver effects closing of the supplemental arming switch means.

42. The improvement of claim 37, wherein the primary arming switch is mounted on the dashboard of the vehicle.

* * * * *

UNITED STATES PATENT AND TRADEMARK OFFICE
CERTIFICATE OF CORRECTION

PATENT NO. : 4,742,806
DATED : May 10, 1988
INVENTOR(S) : Tart, Jr. et al.

It is certified that error appears in the above-identified patent and that said Letters Patent is hereby corrected as shown below:

Column 12, line 59, "table" should read -- the --.

Column 13, line 10, after "depression of" and before "the" insert therein -- the activator by --.

Column 15, line 2, "contorl" should read -- control --.

Column 16 line 4, "threfrom" should read -- therefrom --.

Signed and Sealed this

Twenty-second Day of May, 1990

Attest:

HARRY F. MANBECK, JR.

*Attesting Officer*  *Commissioner of Patents and Trademarks*